(12) United States Patent
Shibahara (10) Patent No.: US 7,799,390 B2
(45) Date of Patent: Sep. 21, 2010

(54) LIQUID CRYSTAL DISPLAY DEVICE AND LIQUID CRYSTAL DISPLAY

(75) Inventor: Seiji Shibahara, Chiba (JP)

(73) Assignee: Sony Corporation, Tokyo (JP)

( * ) Notice: Subject to any disclaimer, the term of this patent is extended or adjusted under 35 U.S.C. 154(b) by 174 days.

(21) Appl. No.: 12/052,372

(22) Filed: Mar. 20, 2008

(65) Prior Publication Data

US 2009/0073372 A1    Mar. 19, 2009

(30) Foreign Application Priority Data

Mar. 30, 2007    (JP)    ............... 2007-094040

(51) Int. Cl.
*C09K 19/52*    (2006.01)
*C09K 19/54*    (2006.01)
*G02F 1/13*    (2006.01)

(52) U.S. Cl. ............... 428/1.1; 252/299.01; 252/299.5; 349/167; 349/177; 349/182

(58) Field of Classification Search .............. 428/1.1; 252/299.01, 299.5; 349/167, 187, 177, 182
See application file for complete search history.

(56) References Cited

U.S. PATENT DOCUMENTS

2004/0033321 A1*    2/2004    Jakli et al. ............... 428/1.3

FOREIGN PATENT DOCUMENTS

| JP | 06-160878 | 6/1994 |
|----|-----------|--------|
| JP | 2000-347174 | 12/2000 |
| JP | 2002-161277 | 6/2002 |
| JP | 2002-357839 | 12/2002 |
| JP | 2005-200500 | 7/2005 |
| JP | 2006-099039 | 4/2006 |

OTHER PUBLICATIONS

English translation by computer for JP 2002-161277, http://www4.ipdl.inpit.go.jp/Tokujitu/PAJdetail.ipdl?N0000=60&N0120=01&N2001=2&N3001=2002-161277.*

Japanese Office Action issued on Jun. 2, 2009 in connection with JP Application No. 2007-094040.

* cited by examiner

*Primary Examiner*—Shean C Wu
(74) *Attorney, Agent, or Firm*—Sonnenschein Nath & Rosenthal LLP (57) ABSTRACT

A liquid crystal display device capable of improving response characteristics while maintaining display characteristics, and a liquid crystal display using such a liquid crystal display device are provided. Provided is the liquid crystal display device including a pair of substrates facing each other, and electrodes and a liquid crystal layer provided between the pair of substrates, where the liquid crystal layer is composed of liquid crystal material including a liquid crystal molecule showing a nematic liquid crystal phase and a molecule providing tilt to the liquid crystal molecule.

15 Claims, 5 Drawing Sheets

LIQUID CRYSTAL DISPLAY DEVICE AND LIQUID CRYSTAL DISPLAY

CROSS REFERENCES TO RELATED APPLICATIONS

The present invention contains subject matter related to Japanese Patent Application JP 2007-094040 filed in the Japanese Patent Office on Mar. 30, 2007, the entire contents of which being incorporated herein by reference.

BACKGROUND OF THE INVENTION

1. Field of the Invention

The present invention relates to a liquid crystal display device, and a liquid crystal display provided with such a liquid crystal display device.

2. Description of the Related Art

Recently, liquid crystal displays which display images by driving liquid crystal display devices have been widely utilized for picture display units such as televisions and a monitors, and information terminals such as digital cameras and mobile phones, because of their low-profile, light-weight, and small power-consumption characteristics. In such liquid crystal displays, as liquid crystal display system of the liquid crystal display devices, there are known twisted nematic (TN) mode using nematic liquid crystal, vertical alignment (VA) mode, in plane switching (IPS) mode, and fringe field switching (FFS) mode (refer to Japanese Unexamined Patent Publication No. Hei-06-160878). In addition, there are known display modes using ferroelectric liquid crystal, antiferroelectric liquid crystal, or the like.

Figure 5:
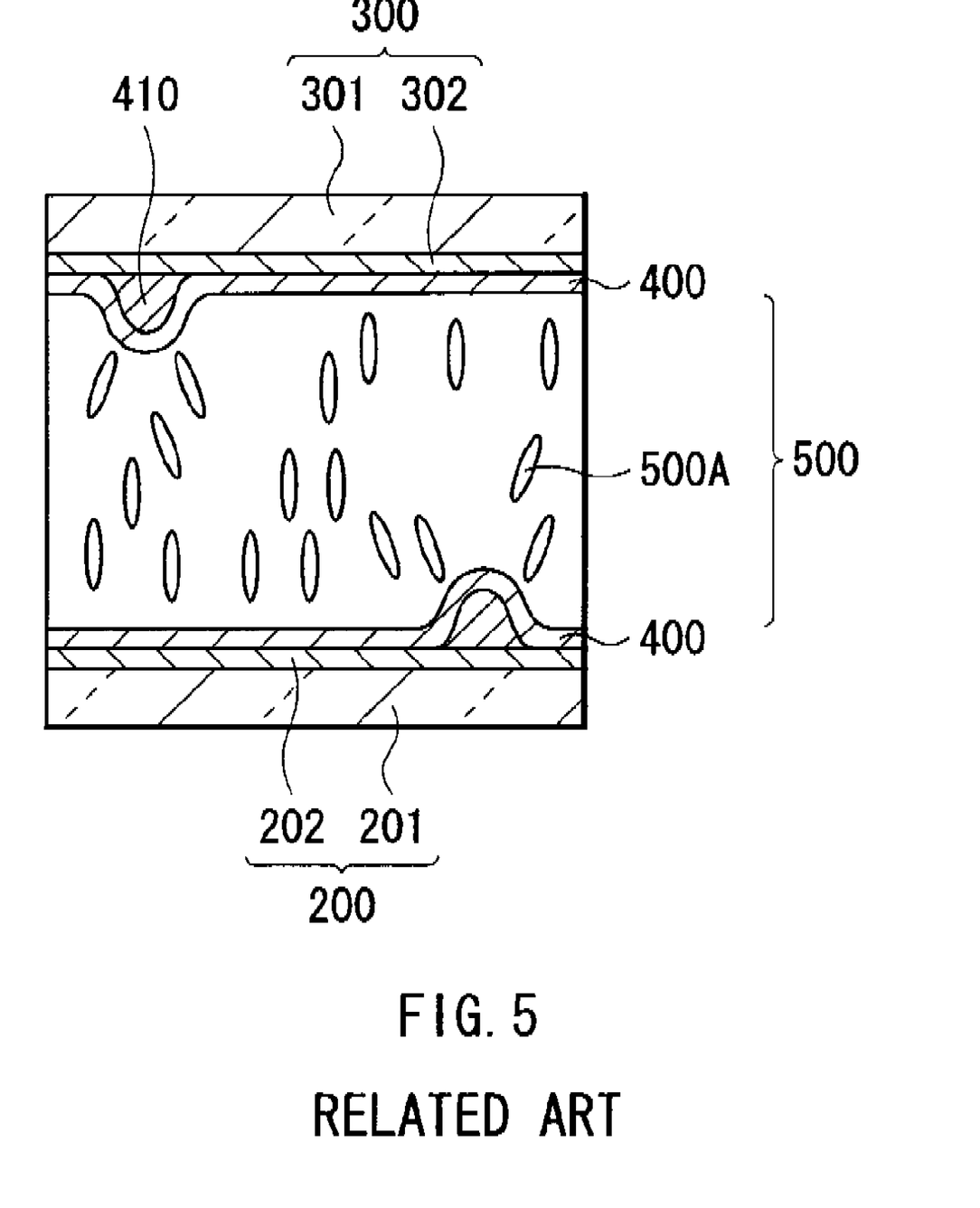
FIG. 5 is a cross sectional view for explaining the liquid crystal display device in the related art.

FIG. 5 illustrates a cross-sectional configuration of a liquid crystal display device of typical VA mode. In this liquid crystal display device, a liquid crystal layer 500 including a liquid crystal molecule 500A is sealed between a drive substrate 200 and a facing substrate 300. In respective facing planes of the drive substrate 200 and the facing substrate 300, there are provided an electrode 202 and an electrode 302, liner projections 410 which do not face each other, alignment films 400 covering over the electrodes 202 and 302, and the liner projections 410. In VA mode, a liquid crystal molecule 500A is oriented substantially perpendicular to planes of the alignment films 400, with no voltage applied. Therefore, the liquid crystal molecule 500A is slightly inclined to surfaces of the drive substrate 200 and the facing substrate 300, in a region in the vicinity of the liner projection 410 (that is, tilt is provided). On the other hand, the liquid crystal molecule 500A is oriented substantially perpendicular to the surfaces of the drive substrate 200 and the facing substrate 300, in a region except the region in the vicinity of the liner projection 410. When the voltage is applied to the liquid crystal layer 500 in this state, the inclination of the liquid crystal molecules 500A located in the vicinity of the liner projection 410 is propagated in sequence to other liquid crystal molecules 500A, and those liquid crystal molecules 500A respond so as to take a posture falling substantially horizontal to the surfaces of the drive substrate 200 and the facing substrates 300. Accordingly, an entering light is modulated. This is because the liquid crystal molecule in VA mode shows a negative dielectric anisotropy; in other words, has a property that the dielectric constant in the long-axis direction of the molecule is smaller than that in the short-axis direction of the molecule.

However, there occurs a difference between the speed, in response to the applied voltage, of falling of the liquid crystal molecule 500A which is oriented perpendicular to the surfaces of the drive substrate 200 and the facing substrate 300, and the speed of falling of the liquid crystal molecule 500A which is located in the vicinity of the linear projection 410, and an issue arises that the response speed of the liquid crystal molecules 500A as a whole with the voltage applied is delayed. Especially, in gradation change from black to intermediate colors, the change amount of the voltage to be applied is small, and this further promotes delay of the response speed. Also, the response speed can be accelerated by shortening the distance between the respective linear projections 410; however, because the upper surface of the linear projections 410 does not contribute to the transmissivity of liquid crystal display device, there arises an issue that, as the ratio of the projections in the liquid crystal display device is increased, the transmissivity is reduced and the display characteristics are degraded.

Thus, Japanese Unexamined Patent Publication No. 2002-357830 proposes the technique in the above VA mode to slightly incline the liquid crystal molecule from the substrate normal and maintain the inclination by using high-polymer materials so that the tilt is provided. Specifically, a liquid crystal layer in which a monomer having light polymerization is added for composition is sealed between substrates, and then is exposed in the state that the tilt is provided to the liquid crystal molecule by applying the voltage so that the monomer is polymerized so as to form the liquid crystal display device forming. In this way, a direction of falling of the liquid crystal molecule can be set in advance in the state with no voltage applied, and this improves the response speed.

SUMMARY OF THE INVENTION

However, in the configuration of the liquid crystal display device of Japanese Unexamined Patent Publication No. 2002-357830, complete polymerization of a monomer is not easy. Even if a small amount of unreacted monomers is present, voltage retention of the liquid crystal material is deteriorated, and this likely causes degradation of the display characteristics.

In view of the foregoing, it is desirable to provide a liquid crystal display device capable of improving response characteristics while maintaining good display characteristics, and a liquid crystal display provided with such a liquid crystal display device.

A first liquid crystal display device according to an embodiment of the present invention includes a pair of substrates facing each other, and electrodes and a liquid crystal layer provided between the pair of substrates, where the liquid crystal layer is composed of liquid crystal material including a liquid crystal molecule showing a nematic liquid crystal phase and a molecule providing the tilt to this liquid crystal molecule. However, the tilt is referred to as an inclination angle with respect to an orientation direction of the liquid crystal molecule. In other words, providing the tile angle to the liquid crystal molecule means changing the inclination angle with respect to the orientation direction of the liquid crystal molecule.

A second liquid crystal display device of an embodiment of the present invention includes a pair of substrates facing each other, and electrodes and a liquid crystal layer provided between the pair of substrates, where the liquid crystal layer is composed of liquid crystal material including a liquid crystal molecule showing a nematic liquid crystal phase and a bent-shaped molecule represented by Chemical Formula 1 which has a dipole moment, and the liquid crystal material shows paraelectric phase.

Chemical Formula 1

(where A is a divalent group; each of W1 and W2 is a monovalent group, and each may be identical or different;

however, a bond angle of W1-A-W2 may be less than 180°; and the bond angle of W1-A-W2 is referred to as an angle formed by a W1-A bond and the W2-A bond and the expression "a bond angle of W1-A-W2 may be less than 180°" means that the time-averaged bond angle is less than 180°).

A liquid crystal display of an embodiment of the present invention is provided with a liquid crystal display device including a pair of substrates facing each other, and electrodes and a liquid crystal layer provided between the pair of substrates, where the liquid crystal layer is composed of liquid crystal material including a liquid crystal molecule showing a nematic liquid crystal phase and a molecule providing the tilt to this liquid crystal molecule.

In the first and second liquid crystal display devices and the liquid crystal display of an embodiment of the present invention, a liquid crystal layer includes a molecule providing the tilt to a liquid crystal molecule, and a bent-shaped molecule indicated in Chemical Formula 1 which has a dipole moment so that the tilt is provided to the liquid crystal molecule without degradation of transmissivity and voltage retention of the liquid crystal molecule.

According to the first and second liquid crystal display devices and the liquid crystal display of an embodiment of the present invention, a liquid crystal layer includes a molecule providing the tilt to a liquid crystal molecule, and a bent-shaped molecule indicated in Chemical Formula 1 which has a dipole moment so that the tilt is provided to the liquid crystal molecule and response characteristics are improved while maintaining good display characteristics.

Other and further objects, features and advantages of the invention will appear more fully from the following description.

DETAILED DESCRIPTION OF THE PREFERRED EMBODIMENTS

Preferred embodiments of the present invention will be described in detail with reference to the accompanying drawings.

First Embodiment

Figure 1A:
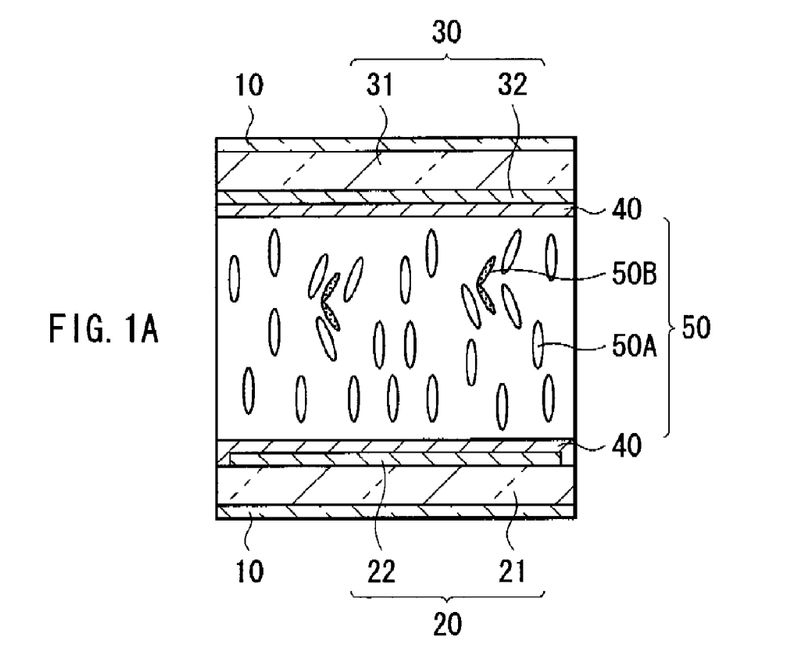
FIGS. 1A and 1B are cross sectional views showing a configuration of a liquid crystal display device equipped on a liquid crystal display according to a first embodiment of the present invention.
Figure 1B:
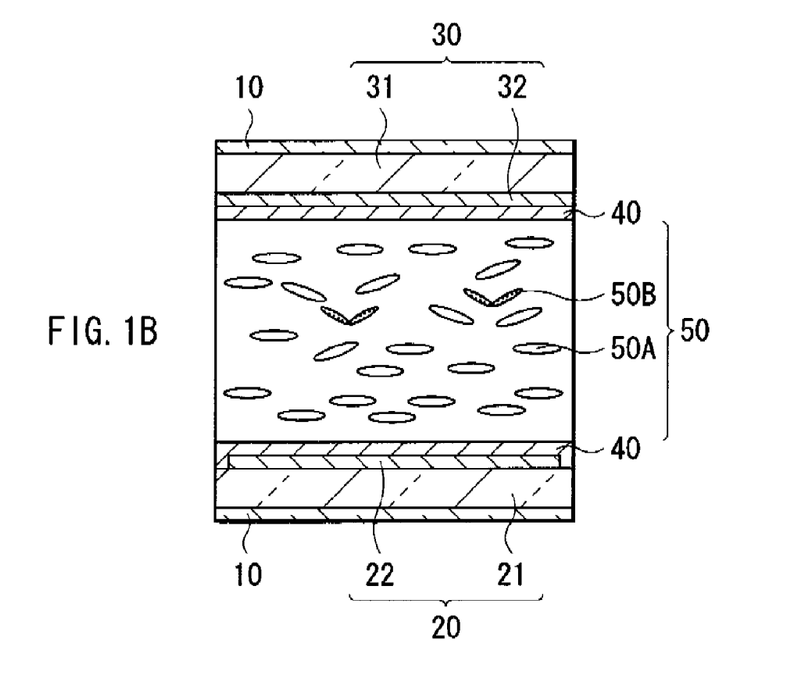

FIGS. 1A and 1B are schematic cross sectional views of a liquid crystal display device equipped on a liquid crystal display according to a first embodiment of the present invention, FIG. 1A showing a state with no drive voltage applied and FIG. 1B showing the state with the drive voltage applied. A display mode of this liquid crystal display device is a so-called vertical alignment (VA) mode.

As shown in FIGS. 1A and 1B, the liquid crystal display device includes, for example, a pixel electrode substrate 20 and a transparent electrode substrate 30 facing each other and disposed between a pair of polarizers 10 facing each other, alignment films 40 disposed so as to cover respective facing surfaces of the pixel electrode substrate 20 and the transparent electrode substrate 30, and a liquid crystal layer 50 sealed between the pixel electrode substrate 20 and the transparent electrode substrate 30 with the alignment films 40 in between. In other words, the liquid crystal display device includes, between the pair of polarizers 10, the pixel electrode substrate 20 and the transparent electrode substrate 30, and, between the pixel electrode substrate 20 and the transparent electrode substrate 30, the liquid crystal layer 50 so as to be sandwiched by the alignment films 40. The liquid crystal display device according to the first embodiment is a so-called transmissive liquid crystal display device.

The polarizer 10 is an optical member having a function to transmit an entering light through a specific polarization component, and controls a vibration direction of the light.

The pixel electrode substrate 20 has a configuration that a pixel electrode 22 is disposed over a transparent substrate 21 in which a drive circuit including a drive element is formed. The transparent substrate 21 is, for example, composed of transparent (light-transmissive) materials such as glass and plastic.

The pixel electrode 22 is one of electrodes for applying the voltage to the liquid crystal layer 50. A plurality of the pixel electrode 22 are, for example, present in order to form an alignment pattern in matrix shape. That is, each of the pixel electrodes 22 is independently and separately supplied with electric potential. The pixel electrode 22 is, for example, a transparent electrode having light-transmissivity, and is, for example, composed of transparent electrode materials such as indium tin oxide (ITO) and the like.

The transparent electrode substrate 30 has a configuration including color filters (not shown in the figure) in which red (R), green (G), and blue (B) filters are provided in stripe shapes, and a transparent electrode 32 which is disposed over substantially an entire effective display region.

The transparent substrate 31 is, for example, composed of transparent (light-transmissive) materials such as glass and plastic. The transparent electrode 32 is the other of the electrodes for applying the voltage to the liquid crystal layer 50, and is, for example, composed of transparent electrode materials such ITO.

The alignment films 40 are for aligning, in a predetermined alignment state, the liquid crystal molecule 50A included in the liquid crystal layer 50. As described above, the alignment films 40 cover over respective inner surfaces of the pixel electrode substrate 20 and the transparent electrode substrate 30; that is, cover over the surfaces of the pixel electrode substrate 20 and the transparent electrode substrate 30, the surfaces being on the sides adjacent to the liquid crystal layer 50. More specifically, on the pixel electrode substrate 20 side, the alignment film 40 covers over the pixel electrode 22 and the substrate 11 located in the vicinity of the pixel electrode 22, and, on the transparent electrode substrate 30 side, the alignment film 40 covers over the transparent electrode 32. The alignment film 40 is, for example, composed of organic materials such as polyimide, and is a perpendicular alignment film for aligning the liquid crystal molecule 50A in the perpendicular direction with respect to the substrate surface. In addition, the alignment films 40 may be subjected to rubbing treatment or the like for controlling the alignment direction.

The liquid crystal layer 50 includes the liquid crystal molecule 50A showing a negative dielectric anisotropy and showing a nematic liquid crystal phase, and liquid crystal material including a molecule 50B which provides tilt to the liquid crystal molecule 60A. As shown in FIG. 1A, in the liquid crystal layer 50, the liquid crystal molecule 50A takes a posture substantially perpendicular to the surfaces of the pixel electrode substrate 20 and the transparent electrode substrate 30 in the state no drive voltage applied; however, because the molecule 50B is included in the liquid crystal layer 50, tilt is provided to the liquid crystal molecule 50A located in the vicinity of the molecule SOB. Thus, the response time is shorted in comparison with the case where the tilt is not provided to the liquid crystal molecule. Therefore, the response speed is improved and the superior response characteristics can be obtained by including the molecule 50B which provides the tilt.

The liquid crystal material preferably has no spontaneous polarization (the spontaneous polarization is substantially zero.) This is because the alignment of the liquid crystal material having the spontaneous polarization is likely disordered, and switching characteristics are likely degraded. The following is a specific explanation. If the liquid crystal material has the spontaneous polarization, self-electric field is formed in the liquid crystal layer, and an ion present in the liquid crystal material travels within the liquid crystal material so as to neutralize this self-electric field so that an electric charge is accumulated in an insulating layer (an alignment film or the like) which is present between the liquid crystal layer and the substrate. At this time, if the drive voltage is applied and switching is performed, a polarization direction is reversed with a change of the alignment direction of the liquid crystal material so that the capacity of the electric charge accumulated in the insulating layer is divided into the liquid crystal material and the insulating layer. Thus, if the state is returned to one with no voltage applied, an electric field in the reverse direction (hereinafter, referred to as a reverse electric field) is induced in the liquid crystal layer. Although this reverse electric field is attenuated by time constant defined by a parallel circuit of the liquid crystal layer and the insulating layer, the reverse electric field disorders the alignment of the liquid crystal material, and may cause degradation of switching characteristics. Because the reverse electric field is proportional to magnitude of the spontaneous polarization of the liquid crystal material, if the spontaneous polarization is zero, the alignment disorder of the liquid crystal material by the reverse electric field is not produced so that the switching characteristics are not degraded. In addition, as a method to measure the spontaneous polarization, there are given a method to utilize pyroelectricity, a method to utilize D-E hysterisis, a method to observe polarization reversal current, or the like.

The expression "one having spontaneous polarization" means, for example, a substance having macroscopic polarization, by which even if the electric field is unapplied, a permanent dipole moment of the molecule is orderly aligned, or an individual atom or ion is shifted from the symmetric equilibrium position. As a substance having the spontaneous polarization and showing the liquid crystal phase, for example, there are given ferroelectric liquid crystal (ferroelectric substance showing the liquid crystal phase), and ferridielectric liquid crystal (ferridielectric substance showing the liquid crystal phase). The term "ferroelectric substance" means one capable of reversing the polarization direction by an external electric field, the one of which having the spontaneous polarization. The term "ferridielectric substance" means one having macroscopic polarization, because of the state that although dipoles of a molecule which makes up the dipoles are aligned in the reverse direction to each other (the alignment where moments are canceled by each other), magnitude of a dipole moment in a forward direction and magnitude of the dipole moment in the backward direction is different. As described above, these ferroelectric liquid crystal and ferridielectric liquid crystal are undesirable to be used as the liquid crystal material for the liquid crystal layer 50, due to a concern about degradation of the switching characteristics.

On the other hand, the expression "one having no spontaneous polarization" means, for example, a substance having no macroscopic polarization, by which in the case the substance is taken as an aggregate of molecules, although these molecules have dipole moments, these dipole moments are oriented in random directions and are canceled by each other as a whole; or a substance by which in the case the substance is taken as solid substance with atoms, molecules, or the like are aligned, an individual atom or molecule, or an ion making up the atom or molecule is aligned in a symmetric equilibrium position and has no polarization. As the substance having no spontaneous polarization, for example, there is given paraelectric, that is, a dielectric substance in which the directions of the dipoles are not uniform in a certain direction so that the dipoles are aligned in random directions (the total dipole moment is zero).

Similar to ferridielectric substance, as a dielectric substance in which the dipoles of a molecule are aligned in directions opposite to each other, there is given an antiferroelectric substance. This antiferroelectric substance has no spontaneous polarization, because magnitude of the dipole moment in the forward direction and magnitude of the dipole moment in the backward direction are equal to each other. However, in the case that voltage of a predetermined threshold value or more is applied to generate an electric field, all the dipoles are oriented in the electric field direction; thereby showing the ferroelectric phase (a phase transition from the antiferroelectric phase to the ferroelectric phase is produced). In the case that such an antiferroelectric substance is employed as the liquid crystal material so as to be used through a compulsory phase transition, the antiferroelectric substance is accompanied with domain growth in stripe shape along an in-plane direction of the liquid crystal layer; thereby there is a risk to induce degradation of a contrast ratio. Therefore, although an antiferroelectric liquid crystal (antiferroelectric substance showing the liquid crystal phase) has no spontaneous polarization, the antiferroelectric liquid crystal is inappropriate as the liquid crystal material used for the liquid crystal layer 50.

As described above, because the liquid crystal molecule 50A shows the negative dielectric anisotropy, a high aperture ratio and superior response characteristics are obtainable. In addition, the dielectric anisotropy ($\Delta\in$) can be obtained by $\Delta\in=\in1-\in2$, where $\in1$ is a dielectric constant in the long axis direction of the liquid crystal molecule, and $\in2$ is the dielectric constant in the short axis direction of the liquid crystal molecule. This dielectric constant can be obtained by $\in=Cpd/S$, where Cp represents a capacitance, "d" represents a thickness of the liquid crystal layer, and "S" represents an area of overlapped portions of two substrates.

The molecule 50B has a dipole moment, preferably shows the liquid crystal phase such as the smectic liquid crystal phase and the nematic liquid crystal phase, and more preferably shows the nematic liquid crystal phase to enhance compatibility with the liquid crystal molecule 50A.

The liquid crystal material preferably includes the molecule 50B with content of 0.5 weight % to 50 weight %. This is because sufficient effects can be likely obtained with the content from 0.5 weight % or more, and superior transmissivity can be obtained with the content of less than 50 weight % so that even in the case of the molecule 50B showing the liquid crystal phase, there is no risk that the liquid crystal material of the liquid crystal layer 50 generates the spontaneous polarization.

As the molecule 50B, for example, a bent-shaped molecule represented by Chemical Formula 2 can be used.

Chemical Formula 2

(where A is a divalent group; each of W1 and W2 is a monovalent group, and each may be identical or different; however, a bond angle of W1-A-W2 may be less than 1800).

This bent-shaped molecule may employ a bent structure and thus the tilt is readily provided to the liquid crystal molecule 50A located in the vicinity of this bent-shaped molecule. In addition, a bond angle of W1-A-W2 of the bent-shaped molecule is preferably 90° or more, and more preferably from 120° to 155°.

As "A" shown in Chemical Formula 2, for example, there is given a divalent group represented by Chemical Formula 3.

Chemical Formula 3

(where X is a hydrogen group (—H), a chlorine group (—CL), a bromine group (—Br), a fluorine group (—F), a nitro group (—NO$_2$), or a cyano group (—CN); and n is an integer of 1 or more).

At least one of W1 and W2 shown in Chemical Formula 2 may be a group represented by Chemical Formula 4, as "B" shown in Chemical Formula 4, there is given a group represented by Chemical Formula 5, and as "R1" shown in Chemical Formula 4, there is given a group represented by Chemical Formula 6.

Chemical Formula 4

(where "B" is a bivalent group having a ring structure; R1 is a bivalent group composed of elements selected from a group consisting of carbon (C), hydrogen (H), oxygen (O), and nitrogen (N); n is an integer of 1 or more; however, in the case that "n" is 2 or more, "B" or "R1" may be identical or different; and R2 is an alkyl group or an alkoxy group having carbon number 1 to 20).

Chemical Formula 5

(where X is a hydrogen group (—H), a chlorine group (—Cl), a bromine group (—Br), a fluorine group (—F), a nitro group (—NO$_2$), or a cyano group (—CN)).

Chemical Formula 6

As an example of the bent-shaped molecule described above, there is given a compound represented by Chemical Formula 7 or Chemical Formula 8.

Chemical Formula 7

-continued (2)

(3)

(4)

Chemical Formula 8

(1)

(2)

(3)

Needless to say, as long as it is a bent-shaped molecule shown in Chemical Formula 2, it is not limited to a compound shown in Chemical Formula 7 and Chemical Formula 8. Also, as long as it is a molecule providing the tilt to the liquid crystal molecule 50A, similarly it is not limited to a bent-shaped molecule shown in Chemical Formula 2.

Figure 2:
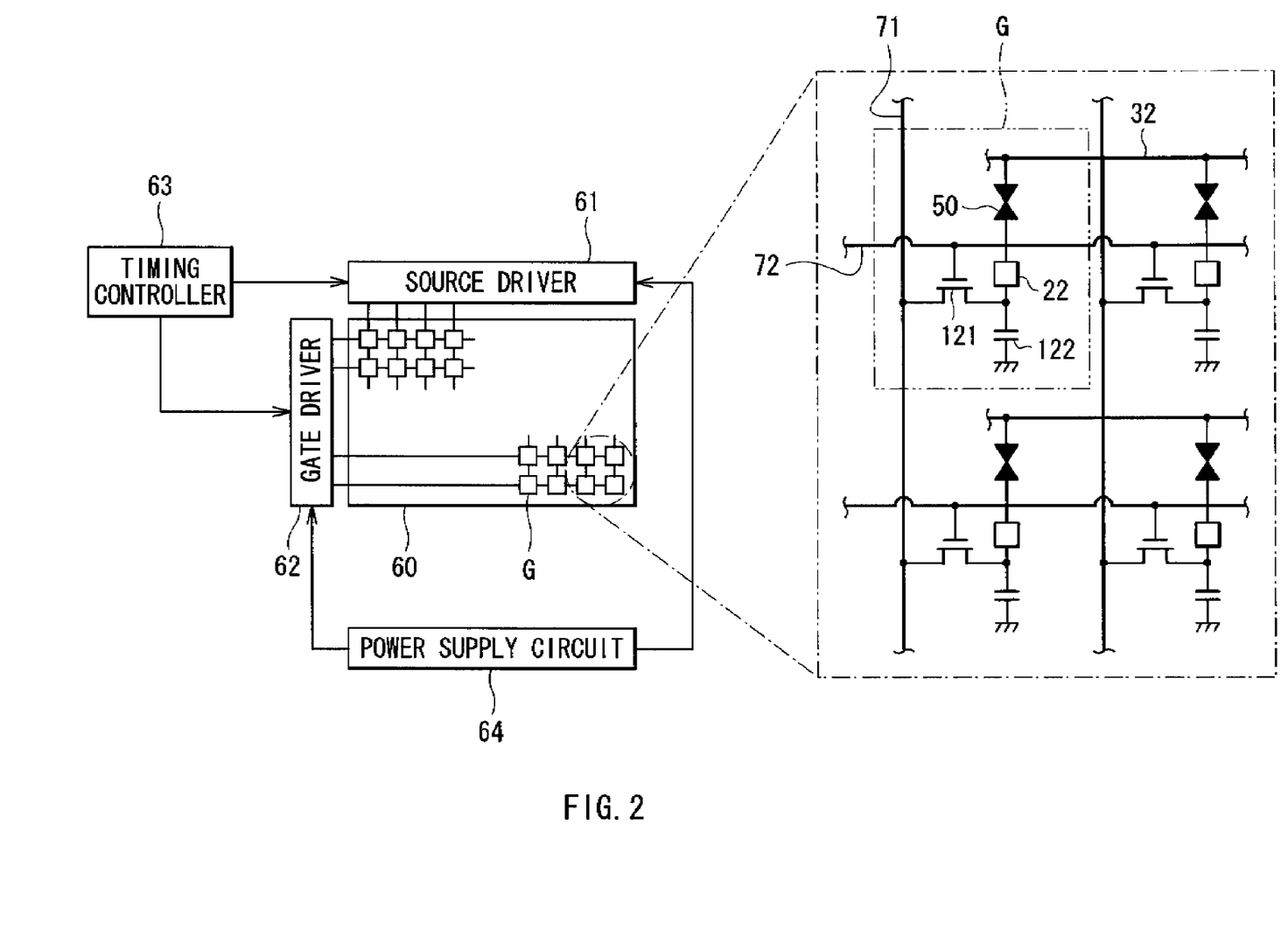
FIG. 2 is a view showing a circuit configuration of the liquid crystal display equipped with the liquid crystal display device illustrated in FIGS. 1A and 1B.

Next, with reference to FIG. 2, a configuration of the liquid crystal display including the abovementnioned liquid crystal display device will be described. FIG. 2 shows a circuit configuration of the liquid crystal display including the liquid crystal display device illustrated in FIGS. 1A and 1B.

As illustrated in FIG. 2, the liquid crystal display includes a display region 60, a plurality of pixels G provided in the display region 60, a source driver 61 and a gate driver 62 provided in the periphery of the display region 60, a timing controller 63 for controlling the source drier 61 and the gate driver 62, and a power supply circuit 64 for supplying electric power to the source driver 61 and the gate driver 62.

The display region 60 is a region where images are displayed, and a configured region capable of displaying images by the alignment of the plurality of pixels G in matrix shape. In addition, FIG. 2 illustrates the display region 60 including the plurality of pixels G, and separately illustrates a region corresponding to four pixels G in enlarged scale.

In this display region 60, a plurality of source lines 71 are aligned in rows and a plurality of gate lines 72 are aligned in columns. Each of the pixels G is disposed in a position where these source line 71 and gate line 72 intersects each other. Each of the pixels G includes a pixel electrode 22, a liquid crystal layer 50, a transistor 121, and a capacitor 122. In each of the transistors 121, a source electrode is connected to the source line 71, a gate electrode is connected to the gate line 72, and a drain electrode is connected to the capacitor 122 and the pixel electrode 22. Each of the source lines 71 is connected to the source driver 61 from which picture signals are supplied. Each of the gate lines 72 is connected to the gate driver 62 from which scan signals are supplied in sequence.

The source driver 61 and the gate driver 62 select a specific pixel G from the plurality of pixels G.

The timing controller 63 outputs, to the source driver 61, a picture signal (for example, each image signal of RGB corresponding to red, green, and blue) and a source driver control signal for controlling the operation of the source driver 61. Also, the timing controller 63 outputs, for example, a gate driver control signal for controlling the operation of the gate driver 62, to the gate driver 62. As the source driver control signal, for example, there are given a horizontal synchronization signal, a start plus signal, a clock signal for the source driver, or the like. As the gate driver control signal, for example, there are given a vertical synchronization signal, a clock signal for the gate driver, or the like.

Next, with reference to FIGS. 1A, 1B and 2, the operation of the liquid crystal display will be described.

In the liquid crystal display, a drive voltage is applied between the pixel electrode 22 and the transparent electrode 32 in the following way so that images are displayed. Specifically, by the input of the source driver control signal from the timing controller 63, the source driver 61 separately supplies a picture signal to the predetermined source line 71 on the basis of the picture signal inputted from the timing controller 63. Also, by the input of the gate driver control signal from the timing controller 63, the gate driver 62 supplies in sequence a scan signal to the gate line 72 at a predetermined timing. Thus, a pixel G is selected, the pixel G located at an intersection of the source line 71 with the picture signal supplied, and the gate line 72 with the scan signal supplied, and the drive voltage is applied to that pixel G.

In the selected pixel G, when the drive voltage is applied, the alignment of the liquid crystal molecule 50A included in the liquid crystal layer 50 is changed from the state illustrated in FIG. 1A to the state illustrated in FIG. 1B according to a potential difference between the pixel electrode 22 and the transparent electrode 32. Specifically, in the liquid crystal layer 50, when the drive voltage is applied, from the state prior to the application of the drive voltage illustrated in FIG. 1A, the liquid crystal molecule 50A provided with the tilt because of being located in the vicinity of the molecule 50B is fallen in own inclination direction, and that movement is propagated to other liquid crystal molecules 60A. As a result, most of the liquid crystal molecules 50A respond so as to take a posture substantially horizontal (parallel) to the pixel electrode substrate 20 and the transparent electrode substrate 30 as illustrated in FIG. 1B. Accordingly, the optical characteristics of the liquid crystal layer 50 are changed so that an entering light entering into the liquid crystal display device becomes a modulated emitted light. According to that emitted light, gradation is expressed and images are displayed. As shown in FIG. 1B, in the case of the molecule 50B showing the liquid crystal phase, the molecule 50B spontaneously takes a posture along the surfaces of the pixel electrode substrate 20 and the transparent electrode substrate 30. However, even in the case of the molecule 50B showing no liquid crystal phase, with the change of the posture of the liquid crystal molecule 60A, the molecule 50B takes a posture so as to extend along the surfaces of the pixel electrode substrate 20 and the transparent electrode substrate 30.

In this way, according to the liquid crystal display device and the liquid crystal display of the first embodiment, because the molecule 50B is included in the liquid crystal layer 50, the tilt is provided (beforehand) to the liquid crystal molecule 50A in a stage prior to the application of the drive voltage so that the response characteristics (response speed) are improved in comparison with the case where such a molecule 50B is not included. Further, there arises no issues such as degradation of transmissivity concerned in the case of providing a linear projection on the surface of the electrode, and deterioration of voltage retention of the liquid crystal material concerned in the case of providing the tilt by the high molecule material which is obtained by polymerization of the monomer. Therefore, superior display characteristics can be maintained. In addition, the manufacturing process can be simplified in comparison with the case where the monomer is polymerized in the state with the voltage applied.

According to the first embodiment, as the liquid crystal material, if a paraelectric liquid crystal having substantially no spontaneous polarization, or especially the paraelectric liquid crystal having the spontaneous polarization which is substantially zero is used, superior switching characteristics are obtained in comparison with the case of using the ferroelectric liquid crystal having the spontaneous polarization, and this works effectively for improving the response characteristics. In addition, the liquid crystal material includes the molecules 50B with content in the range from 0.5 weight % to 50 weight %, thereby maintenance of superior display characteristics, and improvement of the response characteristics can be further expected.

By employing one showing the liquid crystal phase, or especially one showing the nematic liquid crystal phase or the smectic liquid crystal phase as the molecule 50B, compatibility with the liquid crystal molecule 50A is enhanced, and this works effectively for improving the response characteristics and maintaining the display characteristics.

In the first embodiment, VA mode using the liquid crystal molecule showing the negative dielectric anisotropy has been described as the liquid crystal molecule 50A included in the liquid crystal layer 50. However, the liquid crystal display device using the liquid crystal molecule showing the positive dielectric anisotropy can also obtain the similar operations and effects by including the molecule 50B which provides the tilt to the liquid crystal layer 50.

Next, an other embodiment (a second embodiment) of the present invention will be described. Similar reference numerals as in the above first embodiment will be used to indicate substantially identical components, thereby the description appropriately omitted. Also, similar operations and effects as in the first embodiment will be appropriately omitted.

Second Embodiment

Figure 3A:
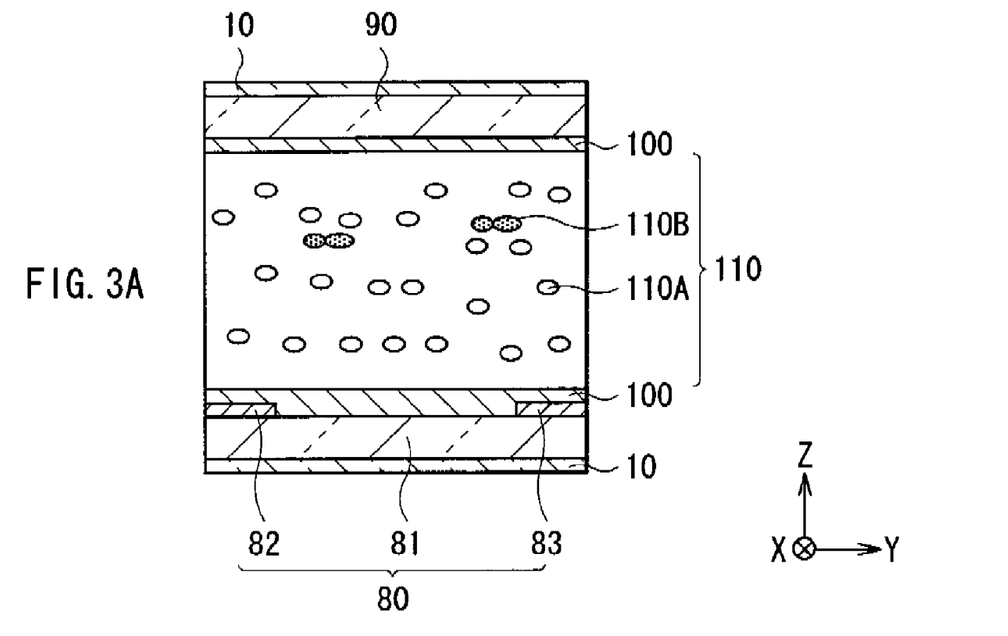
FIGS. 3A and 3B are cross sectional views showing a configuration of the liquid crystal display device equipped on the liquid crystal display according to a second embodiment of the present invention.
Figure 3B:
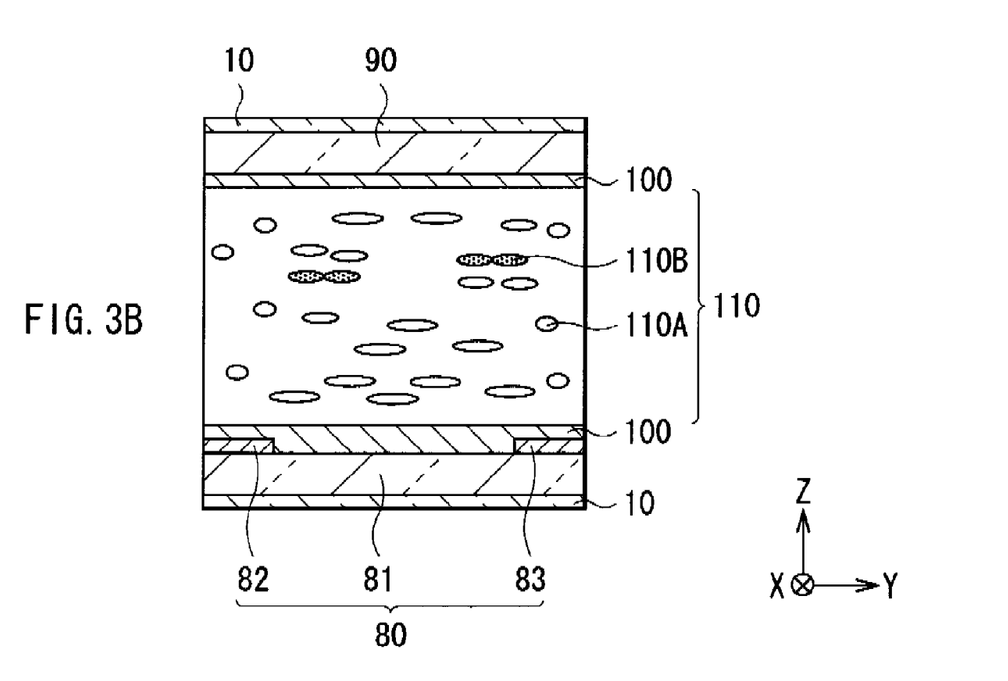
Figure 4A:
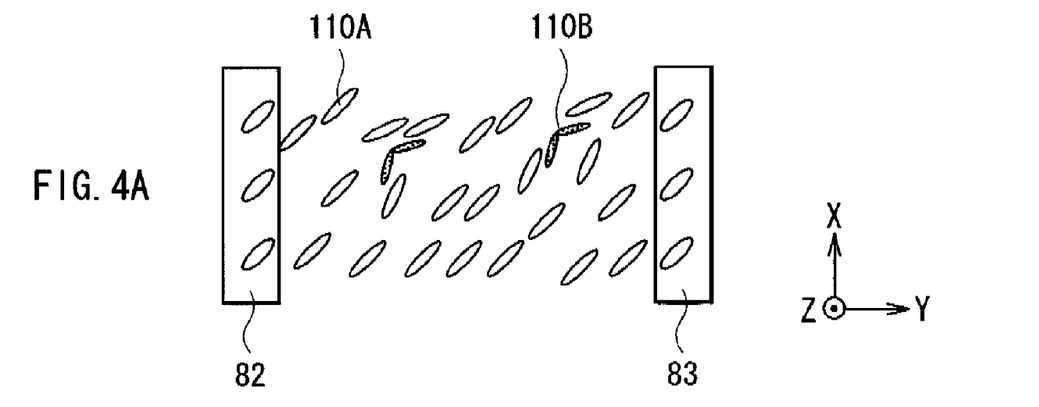
FIGS. 4A and 4B are views showing a plan configuration of the liquid crystal display illustrated in FIGS. 3A and 3B.
Figure 4B:
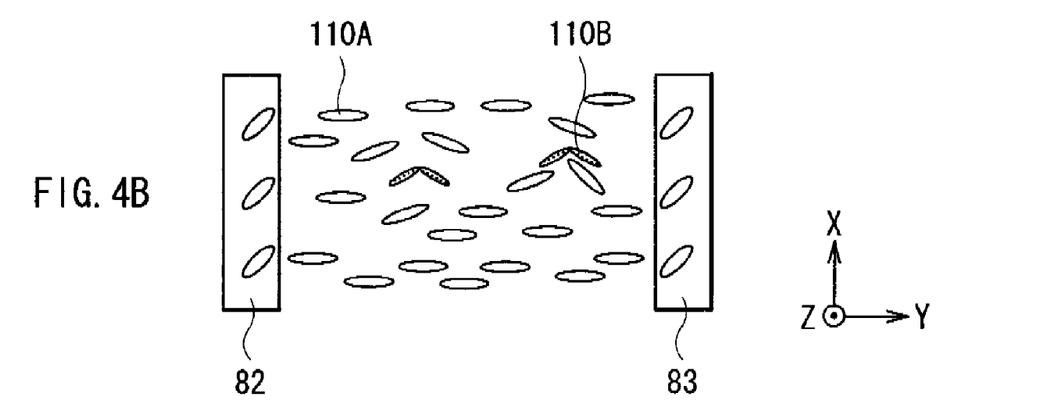

FIGS. 3A and 3B are schematic cross sectional views of a liquid crystal display device equipped on a liquid crystal display as in the second embodiment. FIGS. 4A and 4B are schematic plan views of FIGS. 3A and 3B. FIGS. 3A and 4A show a state with no drive voltage applied, and FIGS. 3B and 4B show the state with the drive voltage applied. A display mode of the liquid crystal display device illustrated in FIGS. 3A, 3B, 4A and 4B is a so-called IPS mode. As illustrated in FIGS. 3A and 3B, the liquid crystal display device has a configuration so as to include an electrode substrate 80 and a transparent substrate 90 facing each other and disposed between a pair of polarizers 10 facing each other, and a pixel electrode 82 and a transparent electrode 83 provided in the electrode substrate 80. For sake of simplicity, specific configurations of each of the substrates illustrated in FIGS. 3A and 3B are omitted in FIGS. 4A and 4B.

The electrode substrate 80 has a configuration where the pixel electrode 82 and the transparent electrode 83 are disposed in parallel with a predetermined spacing over the transparent substrate 81 with a drive circuit including a drive element. The transparent substrate 81 is, for example, composed of transparent (light-transmissive) material such as glass and plastic.

The pixel electrode 82 and the transparent electrode 83 are electrodes for applying the voltage to the liquid crystal layer 50. The pixel electrode 82 and the transparent electrode 83 are, for example, transparent electrodes having light-transmissivity, and are composed of transparent electrode materials such as indium tin oxide (ITO) and the like.

The transparent electrode substrate 90 has a configuration including color filters (not shown in the figure) in which red (R), green (G), and blue (B) filters are provided in stripe shapes, and is composed of transparent (light-transmissive) materials such as glass and plastic.

The alignment films 100 are for aligning, in a predetermined alignment state, the liquid crystal molecule 110A included in the liquid crystal layer 110. These alignment films 100 cover over respective inner surfaces of the electrode substrate 80 and the transparent substrate 90; that is, cover over the surfaces of the electrode substrate 80 and the transparent substrate 90, the surfaces being on the sides adjacent to the liquid crystal layer 110. In addition, the alignment film 100 may be subjected to rubbing treatment or the like for controlling the alignment direction.

The liquid crystal layer 110 includes the liquid crystal molecule 110A showing a positive dielectric anisotropy and showing a nematic liquid crystal phase, and liquid crystal material including a molecule 10B which provides tilt to the liquid crystal molecule 111A. In the liquid crystal layer 110, as shown in FIGS. 3A and 4A, in the state with no drive voltage applied, the liquid crystal molecule 110A takes a posture tilted (approximately 45°) to the pixel electrode 82 and the transparent electrode 83, and substantially horizontal to the surfaces of the pixel electrode 80 and the transparent substrate 90; however, because the molecule 10B is included in the liquid crystal layer 110, the tilt is provided to the liquid crystal molecule 110A located in the vicinity of the molecule 110B. Thus, the response time is shorted in comparison with the case where the tilt is not provided to the liquid crystal molecule. Therefore, the response speed is improved and the superior response characteristics are obtained by including the molecule 110B.

Similarly to the first embodiment, the liquid crystal material preferably has no spontaneous polarization, or preferably the spontaneous polarization is substantially zero. Also the liquid crystal material shows preferably paraelectric phase. The configuration of the molecule 110B providing the tilt is similar to the case of the first embodiment.

The circuit configuration of the liquid crystal display equipped with the liquid crystal display device is similar to the case of the first embodiment.

In the liquid crystal display device, when the drive voltage is applied, the alignment of the liquid crystal molecule 110A included in the liquid crystal layer 110 is changed from the state illustrated FIG. 3A and FIG. 4A to the state illustrated in FIG. 3B and FIG. 4B, according to a potential difference between the pixel electrode 82 and the transparent electrode 83. Specifically, in the liquid crystal layer 110, when the drive voltage is applied, from the state prior to the application of the drive voltage illustrated in FIGS. 3A and 4A, the liquid crystal molecule 110A provided with the tilt because of being located in the vicinity of the molecule 110B is rotated in own inclination direction, and that movement is propagated to other liquid crystal molecules 110A. As a result, most of the liquid crystal molecules 111A respond so as to take a posture substantially orthogonal to the pixel electrode 82 and the transparent electrode 83, and substantially horizontal to the surfaces of the electrode substrate 80 and the transparent substrate 90, as illustrated in FIGS. 3B and 4B. In addition, the liquid crystal molecule 110A located above the electrode substrate 80 and the transparent substrate 90 makes almost no operation even with the drive voltage applied. As shown in FIGS. 3B and 4B, in the case of the molecule 110B showing the liquid crystal phase, the molecule 110B spontaneously takes a posture substantially orthogonal to the pixel electrode 82 and the transparent electrode 83 and extends along the surfaces of the pixel substrate 80 and the transparent substrate 90. However, even in the case of the molecule 110B showing no liquid crystal phase, with the change of the posture of the liquid crystal molecule 111A, the molecule 110B takes a posture substantially orthogonal to the pixel electrode 82 and the transparent electrode 83 and extends along the surfaces of the electrode substrate 80 and the transparent substrate 90.

According to the liquid crystal display device and the liquid crystal display of the second embodiment, because the molecule 110B is included in the liquid crystal layer 110, the tilt is provided to the liquid crystal molecule 110A (beforehand) in a stage prior to the application of the drive voltage so that the response characteristics are improved in comparison with the case where such a molecule 110B is not included. Therefore, superior display characteristics can be maintained.

In addition, in the second embodiment, IPS mode using the liquid crystal molecule which shows the positive dielectric anisotropy has been described as the liquid crystal molecule 110A showing the nematic liquid crystal phase, the liquid crystal molecule 110A included in the liquid crystal layer 110; however, needless to say, even in the case of the liquid crystal molecule showing the negative dielectric anisotropy, similar operations and effects can be obtained by including the molecule 110B which provides the tilt.

EXAMPLES

Next, examples according to the present invention will be described.

Example 1

A liquid crystal display device (VA mode) according to the first embodiment as illustrated in FIGS. 1A and 1B was fabricated by the following steps. That is, a pixel electrode substrate 20 provided with a pixel electrode 22 of ITO which was located over a glass transparent substrate 21, and a transparent substrate 30 provided with a transparent electrode 32 of ITO which was located over a glass transparent substrate 31 were prepared. Next, alignment films 40 were formed respectively over the pixel electrode substrate 20 and the transparent electrode substrate 30. Next, the pixel electrode substrate 20 and the transparent electrode substrate 30 faced each other so that the respective alignment films 40 faced each other, and then a seal material was sealed with plastic beads in between so as to set a cell gap between these substrates 4 μm. Next, the liquid crystal material including MLC-7026 (by Merck Ltd., Japan) as the liquid crystal molecule 50A showing a negative dielectric anisotropy and showing a nematic liquid crystal phase, and compounds indicated in Chemical Formula 7 (1) as a molecule 50B providing tilt were sealed in the cell gap. At that time, the content of the compounds indicated in Chemical Formula 7 (1) was made to be 1 weight % in the liquid crystal material. Finally, polarizers 10 were stuck on outer surfaces of the transparent substrates 21 and 31, that is, in a position facing a plane where the alignment films 40 were formed with the transparent substrate 21 and the transparent substrate 31 in between so that the polarizer 10 was orthogonal to the absorption axis of the polarizer 10; thereby a transmissive liquid crystal display device was fabricated.

Comparative Example 1

Similar steps as in the example 1 were taken except that compounds indicated in Chemical Formula 7 (1) were not included in the liquid crystal material.

Response characteristics were examined on the example 1 and the comparative example 1. For the response characteristics, at room temperature, the time (response time) from a state with no drive voltage applied to the state where the liquid crystal molecules were completely fallen with the drive voltage of the threshold value or more applied were measured.

As a result of measuring the response time, the example 1 showed 33 m seconds, and the comparative example 1 showed 40 m seconds. In other words, in the liquid crystal display device of VA mode, it was confirmed that the response characteristics could be improved, because the liquid crystal layer 50 includes the molecule 50B (a bent-shaped molecule indicated in Chemical Formula 2) providing tilt to the liquid crystal molecule 50A which shows the negative dielectric anisotropy. Also, because the compounds indicated in Chemical Formula 7(1) showed the liquid crystal phase and showed the smectic liquid crystal phase, it was confirmed that the molecule providing the tilt was preferably one showing the liquid crystal phase, and was preferably also one showing the nematic liquid crystal phase from the viewpoint of compatibility with the liquid crystal molecule 50A. Needless to say, spontaneous polarization of the abovementioned liquid crystal material is zero, and the liquid crystal material shows paraelectric phase. Further, a bond angle of the compounds indicated in Chemical Formula 7 (1) corresponding to the bond angle of W1-A-W2 of the compounds indicated in Chemical Formula 2 was within the range from 90° or more and less than 180°, or might be within the range from 120° to 155° so that it was confirmed that the abovementioned range of the bond angle is an appropriate range.

Example 2

Next, the liquid crystal display device (IPS mode) according to the second embodiment illustrated in FIGS. 3A, 3B, 4A and 4B was fabricated by the following steps. That is, a pixel electrode substrate 82 of ITO provided over a glass transparent substrate 81, an electrode substrate 80 provided with a transparent electrode 83 of ITO, and a glass transparent substrate 90 were prepared. Next, alignment films 100 were formed respectively over the electrode substrate 80 and the transparent substrate 90. Next, the electrode substrate 80 and the transparent substrate 90 faced each other so that the respective alignment films 100 faced each other, and then a seal material was sealed with plastic beads in between so as to set a cell gap between these substrates 4 μm. Next, liquid crystal material including MLC-15900 (by Merck Ltd., Japan) as the liquid crystal molecule 110A showing a positive dielectric anisotropy and showing a nematic liquid crystal phase, and compounds indicated in Chemical Formula 7 (1) as a molecule 110B providing tilt were sealed in the cell gap. At that time, the content of the compounds indicated in Chemical Formula 7 (1) was made to be 1 weight % in the liquid crystal material. Finally, polarizers 10 were stuck on outer surfaces of the transparent substrates 81 and 91, that is, in a position facing a plane where the alignment films 100 were formed with the transparent substrate 81 or the transparent substrate 90 in between so that the polarizer 10 is orthogonal to the absorption axis of the polarizer 10; thereby a transmissive liquid crystal display device was fabricated.

Comparative Example 2

Similar steps as in the example 2 were taken except that compounds indicated in Chemical Formula 7 (1) were not included in the liquid crystal material.

Similarly to the example 1 and the comparative example 1, response characteristics were examined on the example 2 and the comparative example 2.

As a result of measuring the response time, the example 2 showed 43 m seconds, and the comparative example 2 showed 52 m seconds. In other words, in the liquid crystal display device of IPS mode, it was confirmed that the response characteristics could be improved, because the liquid crystal layer 110 includes the molecule 110B (bent-shaped molecule indicated in Chemical Formula 2) providing tilt to the liquid crystal molecule 110A which shows the positive dielectric anisotropy. Also, because the compounds indicated in Chemical Formula 7 (1) showed the liquid crystal phase and showed the smectic liquid crystal phase, it was confirmed that the molecule providing the tilt was preferably one showing the liquid crystal phase, and was also preferably one showing the smectic liquid crystal phase from the viewpoint of compatibility with the liquid crystal molecule 111A. Needless to say, spontaneous polarization of the abovementioned liquid crystal material is zero, and the liquid crystal material shows paraelectric phase. Further, a bond angle of the compounds indicated in Chemical Formula 7 (1) corresponding to the bond angle of W1-A-W2 of the compounds indicated in Chemical Formula 2 was within the range of 90° or more and less than 180°, or might be within the range from 120° to 155° so that it was confirmed that the abovementioned range of the bond angle was appropriate.

From the results of the examples 1 and 2, and the comparative examples 1 and 2, regardless of that the liquid crystal molecule included in the liquid crystal material shows the positive dielectric anisotropy or the negative dielectric anisotropy, it was confirmed that the response characteristics could be improved as long as the liquid crystal material included the molecule providing the tilt to that liquid crystal molecule. Especially, it was confirmed that response time was short and significant effects could be obtained in the liquid crystal display device of VA mode in comparison with the case of the liquid crystal display device of IPS mode.

Hereinbefore, the liquid crystal display device of the present invention and the liquid crystal display equipped with the liquid crystal display device have been described with the embodiments and the examples; however, the present invention is not limited to the aspects described in the embodiments and the examples.

Specifically, for example, the liquid crystal display device was VA mode or IPS mode in the embodiments and examples; however, the present invention is not limited to these, and the liquid crystal display device can be TN mode or FFS mode.

The transmissive liquid crystal display device and the liquid crystal display equipped with the transmissive liquid crystal display device have been described in the embodiments and examples; however, the present invention is not necessarily limited to these. For example, the reflective liquid crystal display device may be used. In the case of the reflective liquid crystal display device, a pixel electrode is composed of electrode materials having light reflectivity such as aluminum.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
   a pair of substrates facing each other; and
   electrodes and a liquid crystal layer provided between the pair of substrates,
   wherein,
   the liquid crystal layer comprises a liquid crystal material including a liquid crystal molecule showing a nematic liquid crystal phase and a molecule providing tilt to the liquid crystal molecule,
   spontaneous polarization of the liquid crystal material is effectively zero, and
   the liquid crystal material shows a paraelectric phase.

2. The liquid crystal display device according to claim 1, wherein the liquid crystal material shows a liquid crystal phase.

3. The liquid crystal display device according to claim 1, wherein the molecule providing the tilt shows the liquid crystal phase.

4. The liquid crystal display device according to claim 3, wherein the molecule providing the tilt shows a nematic liquid crystal phase.

5. The liquid crystal display device according to claim 3, wherein the molecule providing the tilt shows a smectic liquid crystal phase.

6. The liquid crystal display device according to claim 1, wherein the molecule providing the tilt is a bent-shaped molecule represented by Chemical Formula 1,
   wherein Chemical Formula 1 is:
(wherein A is a divalent group; each of W1 and W2 is a monovalent group; and a time-averaged bond angle of W1-A-W2 is less than 180°).

7. The liquid crystal display device according to claim 1, wherein the liquid crystal molecule shows a negative dielectric anisotropy.

8. The liquid crystal display device according to claim 1, wherein the electrodes are formed in both of the pair of substrates.

9. The liquid crystal display device according to claim 1, wherein the liquid crystal molecule shows a positive dielectric anisotropy.

10. The liquid crystal display device according to claim 1, wherein the electrodes are formed in one of the pair of substrates, and generate a lateral electric field having a component parallel to a surface of the substrate.

11. The liquid crystal display device according to claim 7, wherein the time-averaged bond angle of W1-A-W2 of the bent-shaped molecule indicated in Chemical Formula 1 is 90° or more.

12. The liquid crystal display device according to claim 7, wherein the time-averaged bond angle of W1-A-W2 of the bent-shaped molecule indicated in Chemical Formula 1 is from 120° to 155°.

13. The liquid crystal display device according to claim 1, wherein a content of the molecule providing the tilt is from 0.5 weight % to 50 weight % in the liquid crystal material.

14. The liquid crystal display device according to claim 6, wherein at least one of W1 and W2 indicated in Chemical Formula 1 is a group represented by Chemical Formula 2,
   wherein Chemical Formula 2 is
(wherein B is a bivalent group having a ring structure; R1 is a bivalent group composed of elements selected from the group consisting of carbon (C), hydrogen (H), oxygen (O), and nitrogen (N); n is an integer of 1 or more; and R2 is an alkyl group or an alkoxy group having carbon number from 1 to 20).

15. A liquid crystal display device comprising:
   a pair of substrates facing each other; and
   electrodes and a liquid crystal layer provided between the pair of substrates,
   wherein
   the liquid crystal layer comprises a liquid crystal material including a liquid crystal molecule showing a nematic liquid crystal phase and a bent-shaped molecule represented by Chemical Formula 3 having a dipole moment, and
   the liquid crystal material shows paraelectric phase and has a spontaneous polarization that is effectively zero,
   wherein Chemical Formula 3 is:
(wherein A is a divalent group; each of W1 and W2 is a monovalent group; and a time averaged bond angle of W1-A-W2 is less than 180°.

* * * * *